United States Patent

[11] 3,572,843

| [72] | Inventor | Haralambo G. Dimopoulos |
| | | Houston, Tex. |
| [21] | Appl. No. | 823,416 |
| [22] | Filed | May 9, 1969 |
| [45] | Patented | Mar. 30, 1971 |
| [73] | Assignee | Shell Oil Company |
| | | New York, N.Y. |

[54] CHECK VALVE ARRANGEMENT FOR PREVENTING PIPELINE SLUMPING
6 Claims, 5 Drawing Figs.

[52] U.S. Cl. .................................................. 302/14,
302/64, 302/66
[51] Int. Cl. .................................................. B65g 53/30
[50] Field of Search .......................................... 302/14, 15,
16, 66, 64

[56] References Cited
FOREIGN PATENTS
587,335   4/1947   Great Britain ................   302/14

*Primary Examiner*—Andres H. Nielsen
*Attorneys*—Thomas R. Lampe and J. H. McCarthy ABSTRACT: Method and apparatus for preventing downhill slumping in a shutdown slurry pipeline. Automatic check valves are placed along the sloping portions of the pipe to prevent plug formation by the slurry material solid phase upon pipeline shutdown. In the downhill sloping portions the check valves are associated with loops in the pipeline to prevent movement of the slurry solid phase when the only driving force is gravity while permitting normal slurry transport.

PATENTED MAR 30 1971

3,572,843

INVENTOR:
H. G. DIMOPOULOS
BY: *Thomas H. Langer*
HIS ATTORNEY

CHECK VALVE ARRANGEMENT FOR PREVENTING PIPELINE SLUMPING

The present invention relates to pipeline transport operations; and more particularly, to a method and apparatus for preventing the downward movement of slurry solids in an inclined portion of pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials in slurry form, problems arise when such materials are moved through pipelines inclined to go over a hill or down into a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties are most commonly avoided by laying solids-carrying or slurry pipelines so that they do not exceed a slope or angle of inclination below which sliding does not occur. Alternatively, the inclined pipeline sections are emptied at each shutdown. Obviously, these alternative prior art approaches are not always feasible or economical, especially in those situations where long and relatively steep slopes are encountered. Slopes of this nature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section is prevented from slumping during a line shutdown.

This and other objects have been attained in the present invention by providing a method and apparatus for preventing downhill slumping in a shutdown slurry pipeline wherein check valves are located at predetermined intervals along sloping portions of the pipeline, said valves effective to close automatically when slurry transport ceases. The check valves, which may be of the flap or swing-check-type, are associated in downhill portions of the line with loops formed in the pipeline and in uphill portions of the line are associated with substantially straight segments of line. This arrangement permits the proper operation of the check valves whether they are disposed in uphill or downhill segments of the pipeline.

DESCRIPTION OF THE DRAWING

The above-noted and other objects of the present invention will be understood from the following description, taken with reference to the accompanying drawing. In describing the invention in detail, reference will be made to the drawing in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline laying activities, although it should be understood that the teachings of the present invention may be carried out in any topographical configuration wherein a portion of slurry pipeline is inclined.

Figure 1:
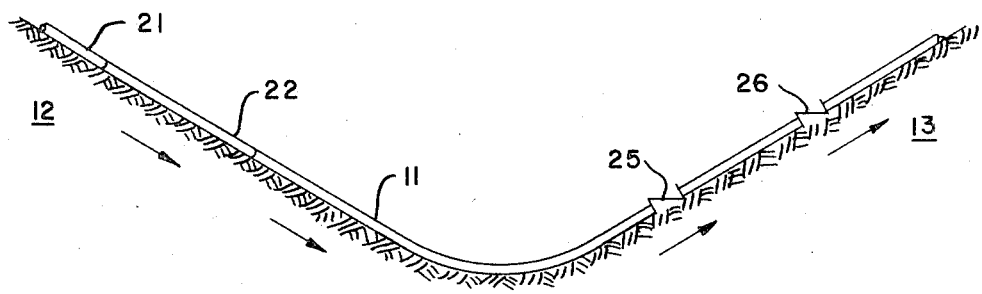
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend. In the illustrated pipeline configuration, such solids would slide downwardly into the valley formed between hills or mountains 12 and 13. The solid material would then compress under its own weight to form a plug in the valley in an obvious manner.

Figure 2:
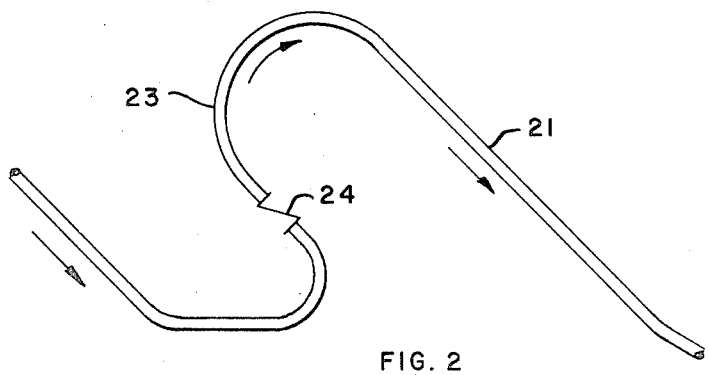
FIG. 2 is an enlarged plan view illustrating a downhill portion of the pipeline having a loop formed therein in operative relationship with a check valve.

Such plug formation is prevented in accordance with the teachings of the present invention as follows. Since normal direction of slurry material flow when the pipeline 11 is in operation is down hill 12 and up hill 13, the inclined portions of the pipeline lying along these hills will be designated as the downhill portion and uphill portion respectively. This designation will be helpful in the proper understanding of the present invention since some modification of the pipeline must be made with respect to the downhill portion so that a simple check valve will operate correctly in accordance with the teachings of the present invention. In the downhill portion of the pipeline a plurality of loops 21 and 22 are formed in the pipeline. Both of the loops lay along the surface of hill 12 and the configuration thereof is such that one leg of the loop proceeds a predetermined distance back up hill 12. The configuration of a representative loop, i.e., loop 21, may be seen more readily with reference to the plan view shown in FIG. 2 wherein leg 23 of the loop doubles back up the hill so that slurry material being pumped up this leg moves against the force of gravity. The configuration of loop 22 is substantially the same and it will be readily understood that in carrying out the teachings of the present invention any desired number of such loops may be formed in the downhill portions of pipeline 11. The uphill leg of each loop employed in the pipeline has operatively disposed therein a check valve, the construction of which will be described in greater detail below. In FIG. 2, the check valve operatively disposed in the uphill leg 23 of loop 21 is illustrated schematically and designated by means of reference numeral 24.

Referring once again to FIG. 1, it may readily be seen that the uphill portion of pipeline 11 also has operatively disposed therein a plurality of check valves. While only two such valves, i.e., valves 25 and 26, are schematically illustrated, once again it should be understood that the number of such valves employed in the pipeline uphill portion depends on the requirements of a given operating condition in conformance with the teachings of the present invention.

Figure 3:
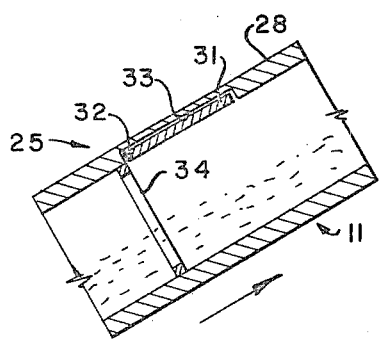
FIGS. 3 and 4 are enlarged cross-sectional views in longitudinal projection illustrating details of a check valve associated with the pipeline section of FIG. 1.
Figure 4:
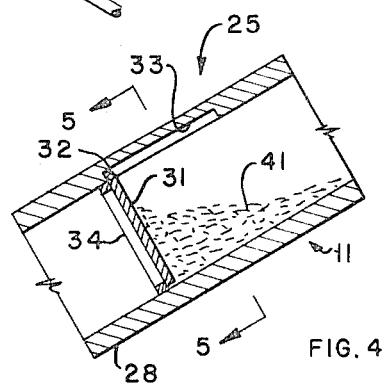
Figure 5:
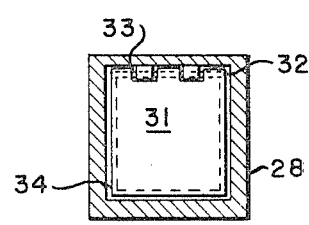
FIG. 5 is a cross-sectional view taken along line 5—5 of FIG. 4.

FIGS. 3, 4 and 5 illustrate a preferred form of check valve which may be employed in pipeline 11. It may be assumed that the illustrated check valve is the one designated generally by means of reference numeral 25 in FIG. 1, although as pointed out above, the construction of all valves employed in the pipeline is substantially identical.

With particular reference to FIG. 5 it may be seen that pipeline 11 at least in the vicinity of the valve is formed so that the walls thereof define a rectangular-shaped housing 28. A flap element 31 is freely pivotally mounted within housing 28 upon a suitable hinge element 32 disposed along the inner peripheral wall of the housing. When slurry material is being pumped through the pipeline 11 in the direction of the arrow in FIG. 3, the flap element is forced by the pressure of the moving slurry material into a suitable recess 33 formed in the housing. However, as slurry material stops moving in the pipeline 11, the flap element 31 falls under the force of gravity out of recess 33 and against valve seat 34 disposed in the housing. This situation is illustrated in FIG. 4. It should be noted that the solid phase slurry material 41 is illustrated as having settled out of suspension. Downward movement or slumping of the slurry material solid phase within the inclined portion of pipeline 11 is, however, terminated by valve flap 31. In this manner plug formation by the slurry material solid phase within pipeline 11 is prevented since the check valves within the line each stop downward movement of quantities of the solid material insufficient to cause plugging by themselves. Upon pipeline restart the slurry material again moves in the direction of the arrow in FIG. 3 and valve flap 31 resumes its position within recess 33.

It may be seen that a check valve of the above-described type in order to work properly must be disposed in pipeline 11 in such a manner as to close automatically under the force of gravity upon the termination of slurry material flow and be opened automatically in the direction of flow upon pipeline restart by slurry material pressure. To satisfy these requirements the valve must be disposed in a section of pipeline wherein slurry material is being pumped uphill against the force of gravity. Hence, it is required that the pipeline in its downhill portion be constructed with loops such as loops 21 and 22 or incorporate other suitable configurations which will satisfy the above requirements.

I claim:

1. Apparatus for minimizing the restart pressure required to restart a shutdown slurry pipeline by preventing downhill slumping of a slurry material solid phase transported by said pipeline, said slurry including a solid phase and a liquid phase, said apparatus comprising:

a pipeline including a downhill portion and an uphill portion and a lowermost portion between said downhill and uphill portions where slumping by gravity of said solid phase is likely to occur, all of said portions defining an interior wherein said slurry material is adapted to be conveyed; and check valve means disposed in both said downhill and uphill pipeline portions, said check valve means being adapted to remain open under the pressure of the slurry material as said slurry material is conveyed within the pipeline and being adapted to close under the force of gravity during pipeline shutdown whereby predetermined quantities of solid phase slurry material are isolated from one another within the pipeline at said downhill and uphill portions and plug formation within the pipeline at said lowermost portion is prevented.

2. The apparatus of claim 1 wherein said check valve means comprises a plurality of flap elements pivotally mounted within the pipeline and a like number of valve seats within the pipeline contacted by the flap elements in a substantially fluid-tight manner upon pipeline shutdown.

3. The apparatus of claim 1 wherein the downhill portion thereof is formed in the shape of a loop with at least a part of the loop proceeding in an uphill direction, said check valve means being disposed in operative relationship with the part of the loop which proceeds in an uphill direction.

4. A method for minimizing the restart pressure required to restart a shutdown slurry pipeline by preventing downhill slumping of a slurry material solid phase transported by said pipeline; said pipeline having at least a downhill and an uphill inclined portion interconnected by a lowermost portion, said pipeline being adapted to transport a slurry including a solid phase and a liquid phase, the lowermost portion of said pipeline being an area where slumping by gravity of said solid phase is likely to occur upon pipeline shutdown, said method comprising:

forming said downhill portion of the pipeline into a loop configuration so that a leg of said loop configuration extends uphill opposite the direction of flow of said slurry material for a predetermined distance so that slurry material pumped into said leg flows upwardly against the force of gravity; and blocking the interior of said pipeline in both the uphill leg of said loop and the uphill inclined portion of said pipeline in a manner permitting said slurry material to pass upwardly through said uphill leg and said uphill inclined portion but preventing the solid phase slurry material from slumping by gravity into the lowermost portion of said pipeline to form a plug therein.

5. The method of claim 4 wherein the interior of said pipeline is blocked in a plurality of locations in said uphill inclined portion thereof.

6. The method of claim 4 wherein a plurality of loops are formed in the downhill portion of said pipeline and the pipeline interior is blocked in each loop.